United States Patent
Müürmann

(10) Patent No.: US 6,591,572 B2
(45) Date of Patent: Jul. 15, 2003

(54) CONNECTOR FOR CONNECTING FLOORS AND WALLS OF SHELVES OR BOX CABINETS

(75) Inventor: Edwin Müürmann, Waldmohr (DE)

(73) Assignee: CS Schmalmobel GmbH & Co. KG, Waldmohr (DE)

( * ) Notice: Subject to any disclaimer, the term of this patent is extended or adjusted under 35 U.S.C. 154(b) by 0 days.

(21) Appl. No.: 09/835,303

(22) Filed: Apr. 13, 2001

(65) Prior Publication Data

US 2002/0148180 A1 Oct. 17, 2002

(51) Int. Cl.⁷ .................................................. E04C 2/38
(52) U.S. Cl. ..................... 52/656.9; 52/283; 52/655.1; 52/261; 403/187; 403/188; 403/382; 403/231
(58) Field of Search ..................... 52/244, 261, 264, 52/655.1, 656.9, 283; 116/212; 403/268, 230, 292, 265, 266, 78, 79, 27, 187, 188, 403, 382, 231

(56) References Cited

U.S. PATENT DOCUMENTS

| 5,286,130 A | * | 2/1994 | Mueller | 403/79 |
| 5,501,544 A | * | 3/1996 | Cairns | 403/400 |
| 5,743,576 A | * | 4/1998 | Schron et al. | 294/1.1 |
| 5,975,786 A | * | 11/1999 | Chang | 403/78 |
| 6,017,071 A | * | 1/2000 | Morghen | 294/94 |
| 6,022,164 A | * | 2/2000 | Tsui et al. | 403/78 |
| 6,025,559 A | * | 2/2000 | Simmons | 403/214 |
| 6,032,993 A | * | 3/2000 | Kwon | 294/1.1 |
| 6,045,290 A | * | 4/2000 | Nocievski | 403/231 |
| 6,200,061 B1 | * | 3/2001 | Goto | 403/268 |

FOREIGN PATENT DOCUMENTS

| GB | 2213861 | * 12/1987 | F16B/11/00 |
| JP | 3-158537 | * 11/1989 | E04B/1/348 |

* cited by examiner

Primary Examiner—Carl D. Friedman
Assistant Examiner—Chi Q Nguyen
(74) Attorney, Agent, or Firm—Bourque & Associates, PA

(57) ABSTRACT

A connector for connecting a horizontal member with at least one vertical member in an interlocking manner includes plastic body in the shape of a cylinder, having one flat side which extends parallel to a longitudinal axis of the cylinder. A pin projects outwardly near a top end in of the plastic body, in a radial manner. A through hole is provided in the plastic body through which a securing screw can be threaded into at least one vertical member against which the connector is disposed.

4 Claims, 1 Drawing Sheet

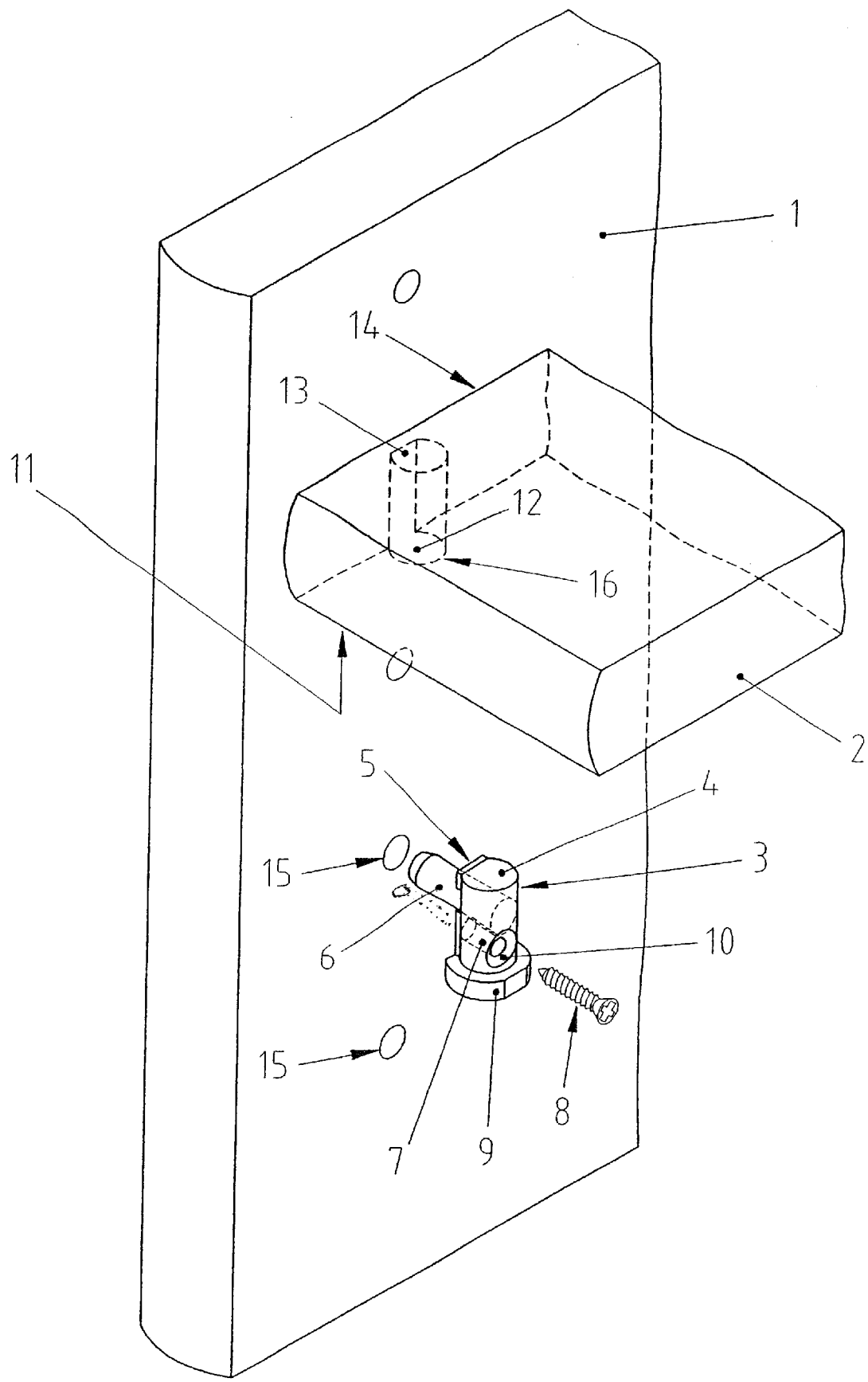

CONNECTOR FOR CONNECTING FLOORS AND WALLS OF SHELVES OR BOX CABINETS

FIELD OF THE INVENTION

The invention relates to a connector for connecting horizontal members with vertical members of shelves, cabinets and other furniture items.

BACKGROUND OF THE INVENTION

In versions of constructed furniture already known, one can differentiate shelf and box type cabinets into those with constructed or structurally attached floors and those with laid or connector or loosely coupled floors. The constructed floors are firmly connected with the walls of the shelf or of the cabinet. Dowel joints are a major case in point. A constructed floor is thus a support element of the concerned body, which is able to support not only vertical loads but also forces or force components acting in the plane extending outward from the corresponding floor.

Laid floors are supported in the vertical direction on the said floor bearings or connectors. As a rule, the floor bearings have a firm joint either with only the shelf or cabinet wall, such as a bolted joint, or they are joined firmly with the relevant floor, with shape lock elements being present on the floor and on the floor bearings, which can interlock with each other. Typically there is then a loose joint, either on the shelf or cabinet wall or on the laid floor, in the direction of the plane extending from the floor.

In special cases, an interlocking joint for the floor bearing has often been used on the wall of the shelf or box cabinet as well as on the laid floors. However, it does not offer the rigidity achieved between constructed floors and the shelf or cabinet walls. The main reason for this is that the interlocking elements did not have adequate dimensions at the two joining points, i.e. between the concerned wall and the floor bearing on one hand and the floor bearing and the floor on the other, and additionally they required handling and/or special installation that was not practical.

SUMMARY OF THE INVENTION

The invention includes an arrangement for connecting horizontal floors and vertical walls of shelving or box cabinets in the assembled condition, in which the floor bearings can be connected, in an interlocking manner, in the direction of the plane extending from the relevant floor, with the concerned wall as well as with the relevant floor. In particular, the present invention is useful with floors and walls that consist of wooden support material, specifically particleboard, which is common in shelving and box cabinets.

It is the purpose of the invention to create such an arrangement for connecting floors, which are horizontal in arrangement and assembly, with walls which are vertical in arrangement and assembly, of shelves and box cabinets, where the floor bearings or connectors have a secure hold in the edge areas of the floor and where they can be fixed permanently on the shelf and box cabinet wall, with easy handling made possible as long as the floor is not supported on the floor bearing. Further, the invention provides a solution for the task where the floor, which is set up on the floor bearing, which can be available as a laid floor, is secured on the concerned wall in such a manner that high force can be transmitted in the horizontal direction, i.e. the direction of the plane extending from the floor or from the walls to the floor, in the same way as in a constructed floor. This is important above all for such shelves and box cabinets, which the end user buys in components as the so-called "Do-it-yourself" item and must reconstruct it at home without expert help.

As a solution for the said task, the connecting bearings or connectors of the present invention have a plastic body having the contours of a beveled cylinder with one side flat and parallel to the cylinder axis of the connector. Further, the floors have holes, countersunk from the underside of the floor, at connecting points on the edge to fit the plastic body of such a connecting bearing. The shape of the holes is the negative profile of the plastic body of the floor bearing. These holes have an opening corresponding to the flattening of the floor bearing at those narrow surfaces of the respective floor in contact with the wall to be joined.

The floor bearings also have pins on their plastic body near their top end, projecting vertically above its flat surface in a radial direction and perpendicular to the cylinder axis of the connector. The vertical walls have holes at their connecting points to accept these pins on the floor bearing. There is a through hole in the plastic body of the bearings below the pin and parallel to it. A securing screw can be threaded into the hole, tapping into the material of the vertical wall, beneath the hole which receives the pin of the floor bearing.

It is important for the invention that the concerned floor bearing be set flush against the relevant wall of the shelving or box cabinet due to the flat surface of its plastic body, whereby the pin inserted in the pertinent hole of the wall is primarily provided to take up the load for the plastic body of the floor bearing, and the securing screw cutting into the material of the vertical wall parallel to it ensures a solid connection between the flat surface of the bearing and the wall. The double fastening prevents any torsion in the floor bearing, particularly around its plastic body. On the other hand, the dimensions of the plastic body can be kept sufficiently large in its cylindrical, non-flattened area, which also applies to the hole matching it in its negative profile, which is countersunk from the underside at the connecting points on the edge in every floor. It is thus possible to transmit large horizontal forces between the floor and the relevant wall, even though the walls and the floors consist of a wooden carrier material, which typically does not display characteristics of great stability.

In a preferred embodiment of the invention, the pin on the floor bearings is a steel pin, which is permanently cast in the plastic material of the plastic body of the floor bearings. With the pin positioned horizontally, the load is primarily vertical, and the pin can withstand high shearing forces due to the execution in steel.

To avoid disturbing projections in the areas where the securing screws are inserted in the plastic body of the floor bearings, the through hole provided in the plastic body has, at its end facing the flat face, a countersunk, beveled chamfer for accepting the securing screw. The securing screw is accordingly designed as a countersunk screw to allow it to drop into the bevel on the through hole in the plastic body.

In another advantageous version according to the invention, the plastic body of the floor bearing has a radially projecting collar at its lower end along its circular peripheral section to reach over the circular edge of the open holes on the underside of the floors. This creates a support for the floors, which reaches under the floors, thus utilizing the entire thickness of the floors for their load capacity in the area of the floor bearing. The floor holes can thus have a depth in the axial direction, as seen from the underside, which is greater than the height of the plastic bodies of the floor bearings above the collar projecting on it. The load, in this version, is taken up only through the projecting collar at the lower end of the plastic body of the floor bearings.

BRIEF DESCRIPTION OF THE DRAWINGS

These and other features and advantages of the present invention will be better understood by reading the following detailed description, taken together with the drawings wherein:

FIG. 1 is a schematic perspective side view of the connector of the present inventnion and its use and position in connecting a floor and wall member.

DETAILED DESCRIPTION OF THE PREFERRED EMBODIMENT

FIG. 1 illustrates, in perspective, the section of a vertical wall 1 which is to be connected with a floor 2. The wall indicated by 1 can be part of a box cabinet or of a shelf, having one or more floors 2, which can be attached to the opposite walls 1 by means of one or more floor bearings 3 on each wall 1.

The floor bearing 3 shown in exploded view has a plastic body 4, which is designed in a cylindrical form over the greater part of its periphery. On the side facing the wall 1 in the mounted arrangement of the floor bearing 3, the plastic body 4 has a flat face 5, extending parallel to the cylinder axis of the plastic body 4 and is flat on the outside, at least in the area of contact with the wall 1.

A pin 6 projects radially outward from the cylindrical area of the plastic body 4. This pin 6 if preferably made of steel and emerges approximately in the top one-third from the plastic body 4. This steel pin is permanently cast in the plastic material of the plastic body 7. The pin 6 projects vertically outward from the flat face 5 of the plastic body 4. The floor bearing 3 is inserted at the wall by means of this pin 6, which is similarly also cylindrical. Typically, the wall 1 has a vertical row of holes 15, which is provided for accepting the pin 6 of a floor bearing 3. With the pin 6 inserted generally entirely into one of the holes 15 of the wall 1, the flat face 5 of the floor bearing 3 lies flat against the facing side of the wall 1.

The floor bearing 3 has a through hole 7 located beneath the pin 6 which extends diametrically through the plastic body 4. The through hole 7 is accordingly positioned parallel with and below the pin 6 in the plastic body 4. With the floor bearing 3 set against the wall 1, a securing screw 8 can be screwed through or struck through the through hole 7. This screw is designed to be a self-tapping screw and taps the material of the wall 1, while threading in it. On the side of the plastic body 4, away from the flat face 5, the through hole 7 has a tapered countersunk chamfer 10, which serves as the seat for the countersunk head of the securing screw 8. The floor bearing 3, attached to the wall 1 and fitted in the appropriate hole 15 of the wall 1 by means of the pin 6, with the flat face 5 on its plastic body 4, can be interlocked against the contact side of the wall 1 by means of the securing screw 8. This secures the plastic body 4 vertically in the direction of the axis of its cylindrical area at the wall 1.

A collar 9 is positioned at the lower end of the plastic body 4 of the floor bearing 3. The collar extends in the peripheral direction of the cylindrical area of the plastic body 4, and projects radially outward. The topside of this collar 9 serves as support for the floor 2.

The floor 2 has a support area on its edge, in which a hole 12 extends vertically, from the underside 11 of the floor 2 and does not reach the topside of the floor 2. The hole 12 represents the negative profile of the plastic body 4 of the floor bearing 3 and, according to the flattening 5 of the plastic body 4 at the floor bearing 3, the hole 12 has an opening 13, located in the area of that narrow side 14 of the floor 2, which lies on the pertaining side of the wall 1 in the assembled position of the floor 2.

Thus the floor 2 can be countersunk on its mutually opposed support sides through one of the floor bearings 3 in such a manner that it reaches over the appropriate plastic body 4 of the floor bearing 3 from the top with the edge holes 12. In the lower end position of the floor 2 is the edge zone 16, which surrounds the hole 12 at the underside 11 of the floor 2, on the topside of the collar 9 at the lower end of the plastic body 4 of the floor bearing 3. In this position, the top end of the plastic body 4 of the floor bearing 3 has not reached the top face wall of the hole 12 in the floor 2, so the floor 2 is supported alone over the edge zone 16 around the hole 12 on the top side of the collar 9 at the plastic body 4 of the floor bearing 3.

Modifications and substitutions by one of ordinary skill in the art are considered to be within the scope of the present invention which is not to be limited except by the claims which follow.

The invention claimed is:

1. A furniture connection system for connecting a vertical furniture member with a horizontal furniture member in an assembled furniture piece, the connection system comprising:
    a connector comprising
        a generally cylindrical plastic body having a length and one flat side which extends parallel to a longitudinal axis of said cylindrical body and runs along the entire length of the cylindrical body, and
        a pin projecting radially outwardly from said flat side into at least one corresponding hole of said vertical member;
    a connecting hole disposed in a bottom edge of said horizontal member and shaped and dimensioned to receive said generally cylindrical body;
    a plurality of adjusting holes disposed in a first flat side of said vertical member and shaped and dimensioned to receive said pin of the connector, whereby when said pin is disposed in one of said adjusting holes, said flat side of said generally cylindrical body is disposed generally flush with the first flat side of said vertical member and said generally cylindrical body can be inserted into said connection hole to interconnect said vertical and horizontal furniture members.

2. The system of claim 1, wherein the generally cylindrical body includes a through hole, and further comprising a securing member for passing through said through hole into said vertical member.

3. The system of claim 1, wherein the body is formed of a plastic and the pin is formed of a metal and permanently cast in the body.

4. The system of claim 1, wherein the body includes a collar radially projecting from a lower end of the body for supporting a circular edge of the connecting hole.

* * * * *